Figure 1:
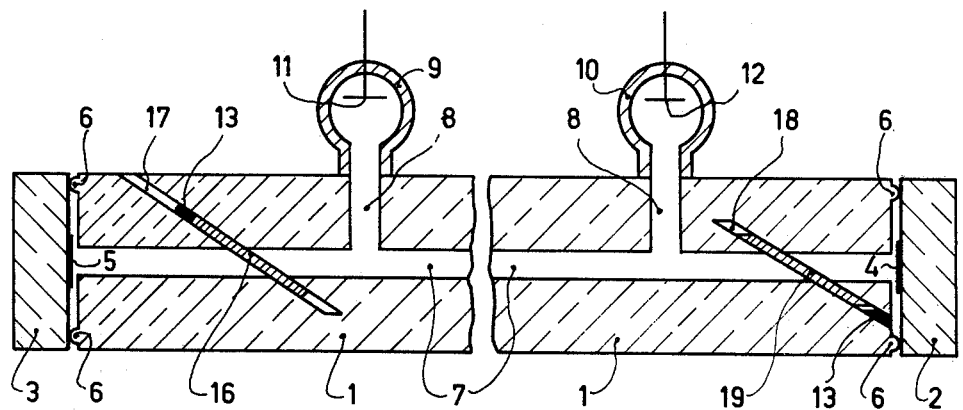

United States Patent [19]

Bulthuis et al.

[11] 4,052,681
[45] Oct. 4, 1977

[54] GAS-DISCHARGE LASER

[75] Inventors: Kornelis Bulthuis; Bram Johan Derksema; Hendrik Tjalling Dijkstra; Johannes van de Wal, all of Eindhoven, Netherlands

[73] Assignee: U. S. Philips Corporation, New York, N.Y.

[21] Appl. No.: 642,069

[22] Filed: Dec. 18, 1975

[30] Foreign Application Priority Data

Mar. 13, 1975 Netherlands .................... 7502973

[51] Int. Cl.² .................................. H01S 3/02
[52] U.S. Cl. .................................. 331/94.5 D
[58] Field of Search .................. 331/94.5 G, 94.5 D, 331/94.5 PE, 94.5 C; 330/4.3; 350/319

[56] References Cited

U.S. PATENT DOCUMENTS

| 3,568,088 | 3/1971 | Dessus | 331/94.5 D |
| 3,790,900 | 2/1974 | Golser | 331/94.5 D |
| 3,942,133 | 3/1976 | Kutay et al. | 331/94.5 D |

Primary Examiner—William L. Sikes
Assistant Examiner—Marcus S. Rasco
Attorney, Agent, or Firm—Frank R. Trifari; Robert S. Smith

[57] ABSTRACT

A gas-discharge laser having a Brewster window near at least one of the reflectors which is secured directly to the laser tube. The Brewster window is secured to a surface of the laser tube and a normal to the window makes an angle equal to the Brewster angle with the axis of the laser tube. The surface may be a slot in the laser tube or a recessed end face of the laser tube near a reflector. An advantage is that the Brewster window may have any convenient diameter and that the laser tube need not be drilled to form a cavity.

3 Claims, 2 Drawing Figures

GAS-DISCHARGE LASER

The invention relates to a gas-discharge laser comprising a gas-discharge tube, part of which forms a laser tube having secured directly to the two ends thereof respective reflectors at least one of which can pass a coherent light beam, and further having in the laser tube near at least one of the reflectors, a plane-parallel transparent plate constituting a Brewster window the normal to which makes an angle with the axis of the laser tube equal to the Brewster angle, the laser tube having a capillary bore.

Such an integral laser is known from the published Dutch patent application No. 6,908,341. In gas-discharge lasers of this type, only light which is linearly polarised in the plane of incidence on the Brewster window will pass through said Brewster window substantially without losses as a result of Fresnel reflections. Consequently, substantially only such polarised radiation is amplified by stimulated emission between the reflectors.

Said Dutch Patent Application describes a number of possibilities for securing the Brewster window in an end of the laser tube. These possibilities have in common the feature that one end of the laser tube comprises a cylindrical cavity the axis of which is parallel to that of the laser tube and in which the Brewster window, which is of cylindrical form and has a diameter equal to that of the cylindrical cavity, is secured by gluing, welding, or the like.

A drawback of these possibilities is that the diameters of the cylindrical cavity and the Brewster window have to be accurately equal, since otherwise the normal to the Brewster window will not make an angle with the axis of the laser tube equal to the Brewster angle (approximately 57°).

Another drawback is that, since the cylindrical cavity has a large diameter compared with the capillary bore, the Brewster window, in order to be sufficiently rigid, has to be rather thick, which results in optical losses which reduce the efficiency of the gas laser.

According to the invention, a gas-discharge laser of the kind mentioned in the first paragraph is characterized in that the Brewster window is secured with a major surface thereof substantially parallel to and engaging a surface of the laser tube, the normal to said surface of the tube making an angle equal to the Brewster angle with the axis of the laser tube.

A significant advantage of a laser embodying the invention is that the cylindrical cavity of the above-mentioned lasers may be omitted, and a thin Brewster window may be used having a size which need not be accurately defined.

If the Brewster window also provides a vacuum seal to the gas-discharge tube, it should preferably be thicker than 1 mm. The freedom of choice of the size of the window is otherwise unaffected.

Said surface of the tube the normal to which makes an angle equal to the Brewster angle with the axis of the laser tube may, for example, be a surface of a slot in the tube. The Brewster window can be secured in said slot in a simple manner by means of an enamel, glue or weld. The slot may be provided during the manufacture of the laser tube by compressing or drilling with ultrasonic vibrations.

The said surface of the tube may alternatively be a recessed end face of the laser tube. Said recessed face may be moulded in the tube.

When the above-mentioned manners of securing the Brewster window are used, it is possible (provided that the window does not form a vacuum seal) to make the Brewster window thinner than 200 $\mu$, which results in only a small transverse displacement of the laser beam. If the Brewster window also provides a vacuum seal in the laser, the Brewster window should, as mentioned above, be thicker than 1 mm. Such an arrangement has the advantage that the gas discharge of the laser can be tested prior to providing the reflectors.

Figure 2:
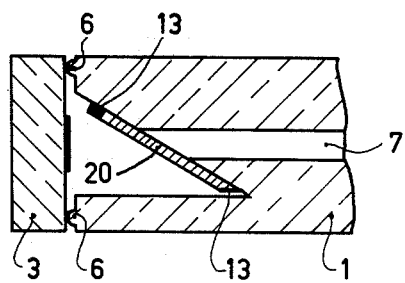

The invention will now be described in greater detail with reference to the (accompanying) drawing, in which:

FIG. 1 is a diagrammatic longitudinal sectional view of the end portions of a gas-discharge laser embodying the invention, and FIG. 2 shows an alternative manner of securing the Brewster window in a laser embodying the invention.

In the gas-discharge laser shown in FIG. 1, a hard glass capillary tube 1 having a capillary bore 7 constitutes the laser tube. The external STET diameter of the tube is 9 mm and the internal STET diameter is 1.7 mm. Two reflectors 2 and 3 which have respective dichroic multi-layers 4 and 5 are provided on annular ridges 6 at respective ends of the laser tube. In the discharge space which is formed by the spaces 7, 8, 9, 10, are electrodes 11 and 12 which constitute the anode and the cathode of the discharge tube. A parallel-sided slot 17 is provided in the laser tube near the reflector 3, the slot extending across the tube from the outer circumferential surface to beyond the bore. The slot is just wide enough for a phase-parallel Brewster window 16 to be slid into it without difficulty. The normal to the parallel surfaces of the slot, and hence to the major surfaces of the Brewster window, makes an angle equal to the Brewster angle (approximately 57°) with the axis of the laser tube. The Brewster window is fixed and sealed in the slot with an enamel 13.

A plane-parallel Brewster window 19 is similarly secured in a slot 18 near the reflector 2, the slot extending through the tube from an axial end face across the bore. The advantage of this arrangement is that the window need not be secured in a vacuum-tight manner, as is the case with the Brewster window 16 in slot 17. Instead of an enamel, other sealing means may also be used, for example, epoxy cement, sealing glass or a metal seal.

FIG. 2 shows an alternative embodiment in which a Brewster window is secured to a recessed end face of the laser tube 1. This may similarly be done with an enamel 13.

Owing to the small diameter of the capillary a thin Brewster window may be used having a thickness of approximately 160 $\mu$m. Such a Brewster window gives a transverse beam displacement (offset) of the laser beam of approximately 80 $\mu$m, which is not seriously disadvantageous, even when a concave reflector is used on the laser tube.

If the Brewster window also provides a vacuum seal in the laser, the window should be thick (at least 1 mm); this will of course result in a larger offset of the laser beam. However, this manner of sealing has an advantage; the reflectors 2 and 3 need be secured only when the desired discharge has been obtained. An additional advantage is that the layers 4 and 5 are no longer in the gas atmosphere of the discharge and hence are polluted less rapidly.

It will be obvious that those skilled in the art will be capable of making many variations to the described embodiments of the invention without departing from the scope of this invention as it is disclosed in the claims and the description.

What is claimed is:

1. A gas-discharge laser which comprises: Means for creating a population inversion, a laser medium and means for stimulating the emission of a laser beam and a gas-discharge tube, part of said tube being an elongated laser tube, said laser tube having secured directly to the two ends thereof respective reflectors, at least one of said reflectors passing a coherent light beam, said laser further having in the laser tube, near at least one of the reflectors, a plane-parallel transparent plate constituting a Brewster window the normal to which makes an angle with the axis of the laser tube equal to the Brewster angle, said laser tube having a capillary bore, said Brewster window being secured with a major surface thereof substantially parallel to and engaging a slot in said laser tube, said slot being disposed in oblique relationship to said axis of said laser tube and extends around at least a portion of said capillary bore, the normal to said surface of the tube making an angle equal to the Brewster angle with the axis of the laser tube.

2. A gas-discharge laser as claimed in claim 1 wherein said Brewster window has a thickness smaller than 200 $\mu$m, the reflectors providing vacuum seals to the gas-discharge tube.

3. A gas-discharge laser as claimed in claim 1 wherein said Brewster window has a thickness exceeding 1 mm and also provides a vacuum seal to the gas-discharge tube.

* * * * *